(12) United States Patent
Chang et al.

(10) Patent No.: US 10,564,760 B2
(45) Date of Patent: Feb. 18, 2020

(54) TOUCH SYSTEM, TOUCH APPARATUS AND CONTROL METHOD THEREOF

(71) Applicant: Wistron Corporation, New Taipei (TW)

(72) Inventors: Yao-Tsung Chang, New Taipei (TW); Ching-Fu Hsu, New Taipei (TW); Ming-Chih Chen, New Taipei (TW); Kuo-Hsing Wang, New Taipei (TW); Jui-Ta Hsieh, New Taipei (TW); Chih-Chung Chiang, New Taipei (TW); Wen-Hua Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 42 days.

(21) Appl. No.: 14/806,660

(22) Filed: Jul. 23, 2015

(65) Prior Publication Data

US 2016/0098139 A1 Apr. 7, 2016

(30) Foreign Application Priority Data

Oct. 1, 2014 (TW) .............................. 103134202 A

(51) Int. Cl.
*G06F 3/045* (2006.01)
*G06F 3/041* (2006.01)
(Continued)

(52) U.S. Cl.
CPC ........ *G06F 3/0416* (2013.01); *G06F 3/03545* (2013.01); *G06F 3/044* (2013.01); *G06F 2203/04104* (2013.01)

(58) Field of Classification Search
CPC .... G06F 3/0416; G06F 3/03545; G06F 3/044; G06F 2203/04104
(Continued)

(56) References Cited

U.S. PATENT DOCUMENTS 6,064,374 A * 5/2000 Fukuzaki ............ G06F 3/03545
178/19.01
6,476,834 B1 * 11/2002 Doval ..................... G06F 9/451
715/863
(Continued)

FOREIGN PATENT DOCUMENTS

CN 102109915 6/2011
CN 103123544 A * 5/2013 ............. G06F 3/044
(Continued)

OTHER PUBLICATIONS

"Office Action of Taiwan Counterpart Application" with English translation, dated Aug. 24, 2015, p. 1-p. 29, in which the listed references were cited.
(Continued)

*Primary Examiner* — Tony O Davis
*Assistant Examiner* — Gerald Oliver
(74) *Attorney, Agent, or Firm* — JCIPRNET

(57) ABSTRACT

A touch system, a stylus, a touch apparatus, and a control method of the touch apparatus are provided. The control method includes following steps. At least one characteristic data of at least one input tool is obtained. An identifier of the input tool is generated according to the characteristic data. If a touch operation on the touch panel is performed with the input tool, a specific function of the touch apparatus is determined according to the identifier of the input tool.

18 Claims, 7 Drawing Sheets

(51) Int. Cl.
   *G06F 3/044*   (2006.01)
   *G06F 3/0354*  (2013.01)
(58) Field of Classification Search
   USPC .................................................. 345/170–178
   See application file for complete search history.

(56) References Cited

U.S. PATENT DOCUMENTS

| | | | | |
|---|---|---|---|---|
| 2004/0179001 | A1* | 9/2004 | Morrison | G06F 3/03545 |
| | | | | 345/179 |
| 2005/0057535 | A1* | 3/2005 | Liu | G06F 3/03545 |
| | | | | 345/179 |
| 2008/0284745 | A1 | 11/2008 | Kao et al. | |
| 2008/0284753 | A1* | 11/2008 | Hsu | G06F 3/0416 |
| | | | | 345/174 |
| 2011/0099493 | A1 | 4/2011 | Yu et al. | |
| 2012/0331546 | A1 | 12/2012 | Falkenburg et al. | |
| 2013/0038339 | A1* | 2/2013 | Peterson | G06F 3/044 |
| | | | | 324/679 |
| 2013/0201155 | A1* | 8/2013 | Wu | G06F 3/03547 |
| | | | | 345/174 |
| 2014/0240261 | A1* | 8/2014 | Heo | G06F 3/041 |
| | | | | 345/173 |
| 2014/0306929 | A1* | 10/2014 | Huang | G06F 3/03545 |
| | | | | 345/174 |
| 2014/0340318 | A1* | 11/2014 | Stringer | G06F 3/03545 |
| | | | | 345/173 |
| 2015/0054784 | A1* | 2/2015 | Kim | G06F 3/0416 |
| | | | | 345/174 |
| 2015/0160744 | A1* | 6/2015 | Mohindra | G06F 3/03545 |
| | | | | 345/179 |
| 2015/0185923 | A1* | 7/2015 | Yoon | G06F 3/044 |
| | | | | 345/174 |

FOREIGN PATENT DOCUMENTS

| | | |
|---|---|---|
| TW | 200512637 | 4/2005 |
| TW | 201115252 | 5/2011 |
| TW | 201305859 | 2/2013 |
| TW | 201308129 | 2/2013 |

OTHER PUBLICATIONS

Office Action of China Counterpart Application, dated Jul. 30, 2018, pp. 1-12.

* cited by examiner

|   |   |   |   |   |   |   |   |   |   |   |   |   |   |   |
|---|---|---|---|---|---|---|---|---|---|---|---|---|---|---|
| 0 | 0 | 0 | 0 | 0 | 0 | 1 | 3 | 2 | 1 | 2 | 0 | 0 | 0 | 0 |
| 0 | 0 | 0 | 0 | 0 | 2 | 4 | 8 | 6 | 7 | 4 | 0 | 0 | 0 | 0 |
| 0 | 0 | 0 | 0 | 2 | 5 | 9 | 12 | 11 | 10 | 5 | 2 | 0 | 0 | 0 |
| 0 | 0 | 0 | 0 | 1 | 4 | 10 | 15 | 12 | 13 | 11 | 6 | 1 | 0 | 0 |
| 0 | 0 | 0 | 0 | 1 | 3 | 8 | 12 | 11 | 9 | 6 | 4 | 1 | 0 | 0 |
| 0 | 0 | 0 | 0 | 0 | 2 | 5 | 8 | 9 | 7 | 3 | 0 | 0 | 0 | 0 |
| 0 | 0 | 0 | 0 | 0 | 0 | 2 | 4 | 5 | 2 | 1 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

TOUCH SYSTEM, TOUCH APPARATUS AND CONTROL METHOD THEREOF

CROSS-REFERENCE TO RELATED APPLICATION

This application claims the priority benefit of Taiwan application serial no. 103134202, filed on Oct. 1, 2014. The entirety of the above-mentioned patent application is hereby incorporated by reference herein and made a part of this specification.

FIELD OF THE INVENTION

The invention relates to a touch technology; more particularly, the invention relates to a touch system capable of identifying touch operations of a plurality of input tools and the corresponding touch commands, a touch apparatus, and a control method thereof.

DESCRIPTION OF RELATED ART

With the development and progress of touch techniques, touch equipment has been playing an essential role in electronic apparatuses, such as notebook computers, mobile phones, tablet PCs, and portable multimedia players. The touch equipment allows a user to perform touch actions through gestures or input tools (e.g., a stylus). Thanks to the advantages of convenient and intuitive operations, the touch equipment has been deeply favored by customers and has become the mainstream equipment on the market. Moreover, touch functions integrated into some large touch equipment including electronic whiteboards further enable teachers or educational institutions to teach students in an interactive manner.

For instance, by means of the application programs executed through the touch apparatuses, students are able to write down the derivation process of mathematical functions on interfaces of the application programs displayed on touch panels, and the teachers or instructors may make necessary revisions with use of painting brushes in different colors. In said scenario, multiple participants are involved, and the touch equipment may neither be able to accurately identify the touch actions performed by the users nor be capable of recognizing the correct touch command corresponding to the touch action performed by each user. Specifically, if multiple users simultaneously perform the touch actions, the touch equipment cannot identify the correct user who performs the corresponding touch action because the touch equipment merely detects whether or not a touch event occurs through sensing electrodes. Therefore, the touch equipment may erroneously determine that all the received touch actions are from the same user and thus misunderstand the touch command. Accordingly, how to identify the correct user who performs the corresponding touch action and determine the touch command corresponding to the touch action has become one of the most imperative issues to be resolved.

SUMMARY OF THE INVENTION

The invention is directed to a touch system, a touch apparatus, and a control method of the touch apparatus, whereby the correct user who performs the corresponding touch action can be identified and the touch command corresponding to the touch action can be determined.

In an embodiment of the invention, a touch apparatus is provided. The touch apparatus includes a touch panel and a processing unit. The processing unit is coupled to the touch panel. The processing unit obtains at least one characteristic data of at least one input tool and generates an identifier of the at least one input tool according to the at least one characteristic data. If a touch operation on the touch panel is performed through the at least one input tool, the processing unit determines a specific function of the touch apparatus according to the identifier of the at least one input tool.

In an embodiment of the invention, a touch system is provided. The touch system includes at least one input tool and a touch apparatus. The touch apparatus includes a touch panel and a processing unit. The processing unit is coupled to the touch panel. Here, the processing unit obtains at least one characteristic data of the at least one input tool and generates an identifier of the at least one input tool according to the at least one characteristic data. If a touch operation on the touch panel is performed through the at least one input tool, the processing unit determines a specific function of the touch apparatus according to the identifier of the at least one input tool.

In an embodiment of the invention, a control method of a touch apparatus is provided, and the touch apparatus includes a touch panel. The control method includes steps of obtaining at least one characteristic data of at least an input tool; generating an identifier of the at least one input tool according to the at least one characteristic data; if a touch operation on the touch panel is performed through the at least one input tool, determining a specific function of the touch apparatus according to the identifier of the at least one input tool.

In view of the above, the touch system, the touch apparatus, and the control method of the touch apparatus are provided in several embodiments of the invention, whereby the input tool can be identified according to the characteristic data, so as to determine the specific function correspondingly performed during the touch operation on the touch apparatus through the input tool. As such, if multiple users respectively performs the touch actions with use of different input tools, the correct user who performs the corresponding touch action can be accurately determined according to an embodiment of the invention, and the corresponding touch command can be executed, such that the issue of misunderstanding the touch command caused by the failure to identify the correct user can no longer arise from the scenario in which multiple users are involved.

Several exemplary embodiments accompanied with figures are described in detail below to further describe the invention in details.

DETAILED DESCRIPTION OF DISCLOSED EMBODIMENTS

In most cases, a touch apparatus merely detects whether or not a touch event occurs; hence, if multiple users simultaneously perform touch actions on the touch apparatus, the touch apparatus cannot identify the correct user who performs the corresponding touch action, which may lead to the misunderstanding of the touch command. In an embodiment of the invention, an identifier may be generated through identifying the characteristic data of an input tool, so as to determine the specific function performed by the touch apparatus during the touch operation on the touch panel through the input tool. Thereby, once the touch action of the input tool is detected, the correct user who performs the corresponding touch action can be accurately determined, and the corresponding command can be executed, such that the issue of misunderstanding the touch command caused by the failure to identify the user can no longer arise from the scenario in which multiple users are involved.

Figure 1A:
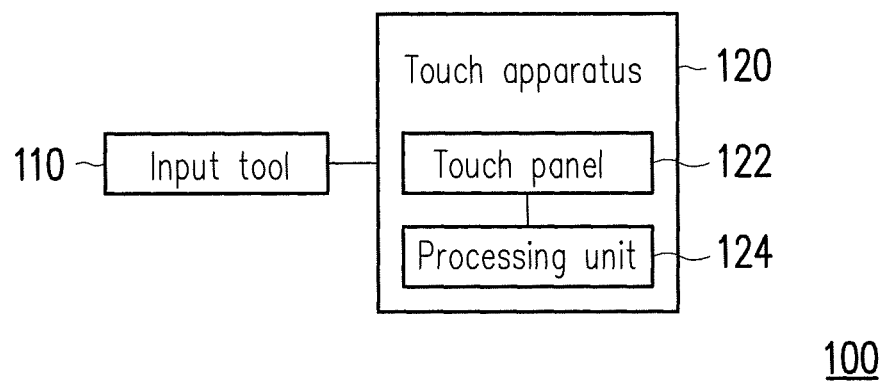
FIG. 1A is a block diagram illustrating a touch system according to an embodiment of the invention.
Figure 1B:
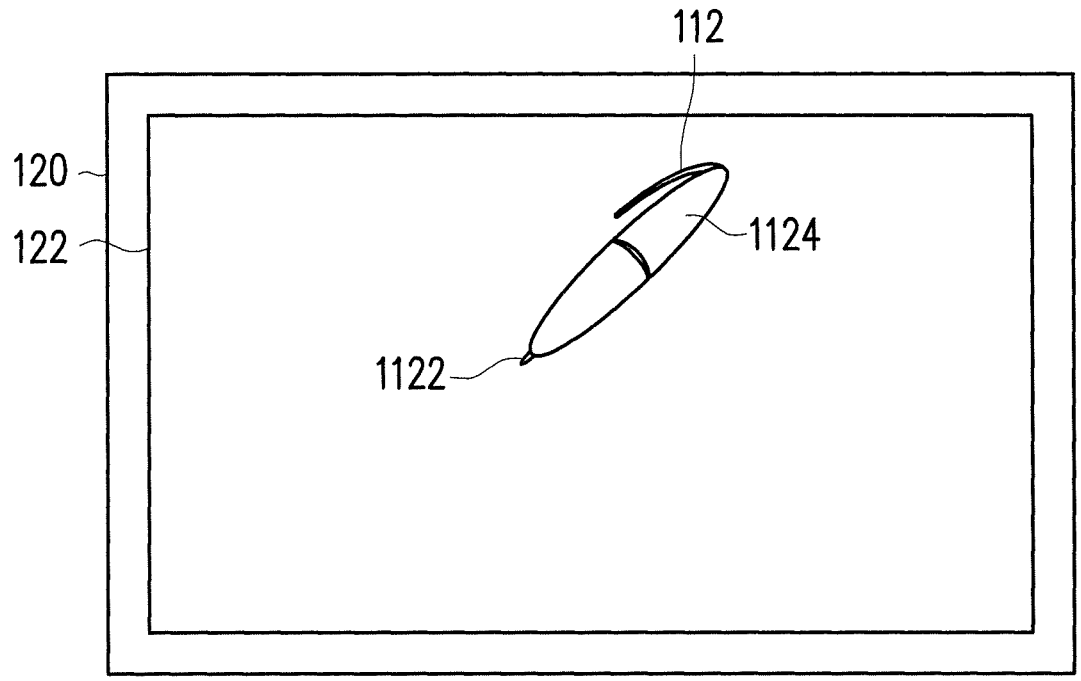
FIG. 1B is a schematic diagram illustrating a touch system according to an embodiment of the invention.

FIG. 1A is a block diagram illustrating a touch system according to an embodiment of the invention. FIG. 1B is a schematic diagram illustrating a touch system according to an embodiment of the invention. With reference to FIG. 1A and FIG. 1B, the touch system 100 includes at least one input tool 110 and a touch apparatus 120. According to the present embodiment as shown in FIG. 1A, one input tool 110 is exemplified for illustrative purposes, whereas the number of the input tool 110 may be adjusted according to actual demands.

The input tool 110 is a stylus or a finger of a user, for instance. In FIG. 1B, the stylus 112 is an example of the input tool 110. The stylus 112 includes a tip 1122 and a body 1124. Here, the tip 1122 and the body 1124 may be independent from each other or integrally formed. The body 1124 is for a user to hold, and the tip 1122 serves to perform the touch action while it approaches the touch apparatus 120.

The touch apparatus 120 is a capacitive touch apparatus, a resistive touch apparatus, an optical touch apparatus, or an electronic apparatus (e.g., a mobile phone, a tablet PC, a notebook computer, and so on) equipped with a touch module (e.g., a capacitive touch module, a resistive touch module, or an optical touch module), for instance. The touch apparatus 120 includes a touch panel 122 and a processing unit 124, and the functions of the touch panel 122 and the processing unit 124 are respectively described below.

The touch panel 122 is a display capable of performing a touch function, such as a liquid crystal display (LCD), an organic electro-luminescent display (OELD), a projection display, etc. One of the capacitive, resistive, and optical touch techniques can be applied in the touch panel 122.

The processing unit 124 is coupled to the touch panel 122. The processing unit 124 may be a central processing unit (CPU), a general or specific programmable microprocessor, a digital signal processor (DSP), a programmable controller, an application specific integrated circuit (ASIC), any other similar device, or a combination thereof. In the present embodiment, the processing unit 124 serves to identify the input tool 110 and thereby determine the specific function of the touch apparatus 120 during the touch operation on the touch apparatus 120 through the input tool 110. As such, the control method of the touch apparatus provided in an embodiment of the invention can be implemented.

Figure 2:
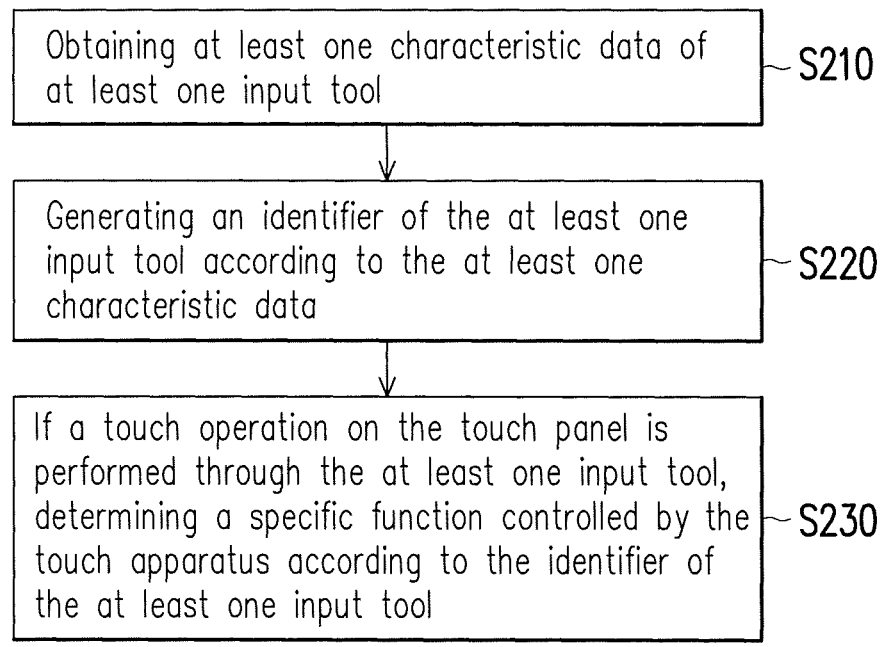
FIG. 2 is a flowchart illustrating a control method of a touch apparatus according to an embodiment of the invention.

Based on said systematic structure, the control method of the touch apparatus described above is elaborated below with reference to several embodiments of the invention. FIG. 2 is a flowchart illustrating a control method of a touch apparatus according to an embodiment of the invention, and the control method is applicable in the touch system 100 depicted in FIG. 1A and FIG. 1B. Detailed steps in the control method provided in the present embodiment are explained with reference to the components and devices depicted in FIG. 1A and FIG. 1B.

In step S210, the processing unit 124 obtains at least one characteristic data of at least an input tool 110. In step S220, the processing unit 124 generates an identifier of the input tool 110 according to the characteristic data.

Specifically, the processing unit 124 may obtain the characteristic data according to at least one of a feature of the tip of the input tool 110, a feature of the body of the input tool 110, and an electrical feature. At least one of the features of the tip includes an area of the tip and shape of the tip; the feature of the body includes a body color, an identification pattern, and a body shape; the electrical feature may be a capacitance of the input tool 110, for instance. The way to obtain the characteristic data will be further elaborated in the following embodiment.

The processing unit 124 may then generate the identifier of the input tool 110 through comparing the characteristic data of the input tool 110 with the predetermined characteristic data. The predetermined characteristic data are recorded in a database, for instance. Specifically, according to the present embodiment, the touch apparatus 120 may include a storage unit having a database, and the database serves to store a plurality of predetermined characteristic data respectively corresponding to a plurality of predetermined identifiers. For instance, the database may record a plurality of input tool data, and each input tool data may include columns of a predetermined identifier, a predetermined characteristic data, a first function correspondingly executed by a first application program, and a second function correspondingly executed by a second application program. Hence, if the processing unit 124 determines the characteristic data of the input tool 110 complies with one of the predetermined characteristic data, or the level of difference between the characteristic data of the input tool 110 and one of the predetermined characteristic data is within a certain range, the processing unit 124 determines that the identifier of the input tool 110 is a predetermined identifier of the predetermined identifiers corresponding to the one of the predetermined characteristic data according to the input tool data stored in the database.

Since errors may occur in reality while the processing unit 124 detects the characteristic data of the input tool 110, the condition of determining whether the level of difference between the characteristic data of the input tool 110 and one of the predetermined characteristic data is within a certain range is also taken into consideration. For instance, if the characteristic data is the area of the tip, and if the level of difference between the area of the tip of the input tool 110 and the predetermined area of the tip is less than 10% of the predetermined area of the tip, the area of the tip may be deemed compliant with the predetermined area of the tip, and thereby the identifier of the input tool 110 can be determined. The storage unit may be any immobile or mobile random access memory (RAM), read-only memory (ROM), flash memory, hard drive, any other similar device, or a combination thereof, which should however not be construed as a limitation to the invention.

If the detected characteristic data does not exist in the database, i.e., if the processing unit 124 determines the characteristic data does not comply with any of the predetermined characteristic data, of if the processing unit 124 determines the level of difference between the characteristic data of the input tool 110 and one of the predetermined characteristic data exceeds a certain range, the processing unit 124 further adds the detected characteristic data to the database and thereby updates the predetermined characteristic data stored in the database, so as to generate the new input tool data.

With reference to FIG. 2, in step S230, if a touch operation on the touch panel 122 is performed through the input tool 110, the processing unit 124 determines a specific function of the touch apparatus 120 according to the identifier of the input tool 110. Specifically, in an embodiment of the invention, the processing unit 124 may detect the touch operation of the input tool 110 on the touch apparatus 120 and convert the touch operation of the input tool 110 into a control command of the specific function according to the identifier of the input tool 110. The processing unit 124 may further transmit the control command to an application program to perform the specific function through executing the application program. Here, the processing unit 124 detects a plurality of touch positions of the input tool 100 according to a time sequence and thereby obtains a touch operation track of the input tool 110.

A sketching and painting application program is taken for example. After the processing unit 124 determines the identifier of the input tool 100 and learns that the identifier corresponds to the function of a red painting brush in the sketching and painting application program according to the input tool data stored in the database, the processing unit 124 may automatically display the touch operation track in the color of red according to the touch operation of the input tool 100 on the touch panel 122. Other identifiers may correspond to other functions, e.g., painting brushes in other colors, an erasing function (as that of an eraser), and so on. It should be mentioned that the correlation between the identifiers and the functions of the application program may be predetermined by the processing unit 124 or by the application program or defined by a user, which should however not be construed as a limitation to the invention.

In light of the foregoing, the characteristic data of the input tool 110 is compared with the predetermined characteristic data in the database according to the present embodiment, so as to identify the input tool 110. Thereby, the correct user who performs the corresponding touch action may be accurately identified, and the specific function correspondingly executed by the application program of the touch apparatus may be determined according to the touch action of each user through the input tool.

Note that various methods of determining the identifier of the input tool 110 are applicable in the present embodiment, and different determination methods may correspond to different flowcharts or different hardware design. The following embodiments respectively illustrated in FIG. 3 to FIG. 6 are provided to explain how the processing unit 124 generates the identifier in case that the characteristic data of the input tool 110 is the feature of the tip, the feature of the body, or the electrical feature.

Figure 3A:
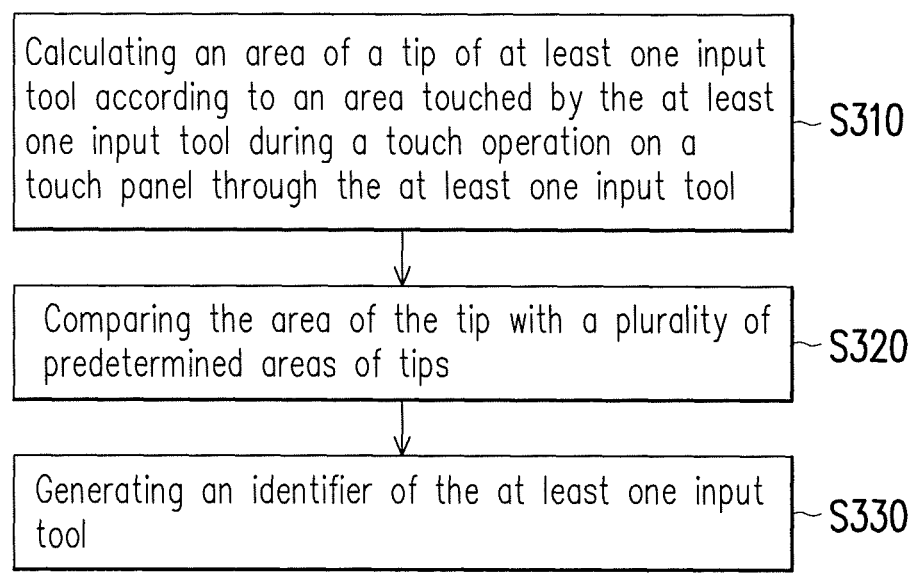
FIG. 3A is a flowchart illustrating a control method of a touch apparatus according to an embodiment of the invention.

First of all, how the identifier is generated according to the area of the tip of the input tool 110 is described. FIG. 3A is a flowchart illustrating a control method of a touch apparatus according to an embodiment of the invention. As shown in FIG. 3A, in step S310, the processing unit 124 calculates the area of the tip according to an area touched by the input tool 110 during the touch operation on the touch panel 122. In step S320, the processing unit 124 compares the area of the tip with a plurality of predetermined areas of tips. In step S330, the processing unit 124 generates the identifier of the input tool 110 according to the comparison result. In consideration of possible errors in actual calculation and comparison of the area of the tip, the level of difference between the compared areas may be set to be the smallest level or within a certain range while comparing the area of the tip and the predetermined areas of tips according to the present embodiment.

Figure 3B:
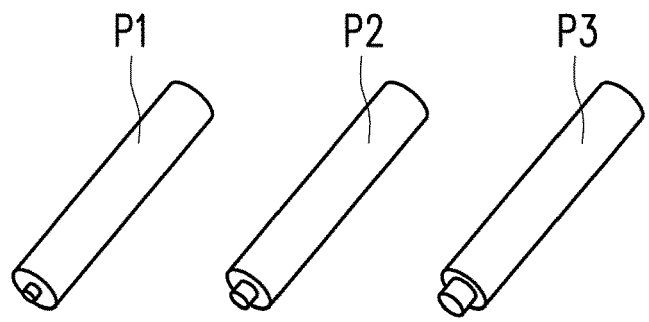
FIG. 3B and FIG. 3C are examples according to an embodiment of the invention.
Figure 3B:
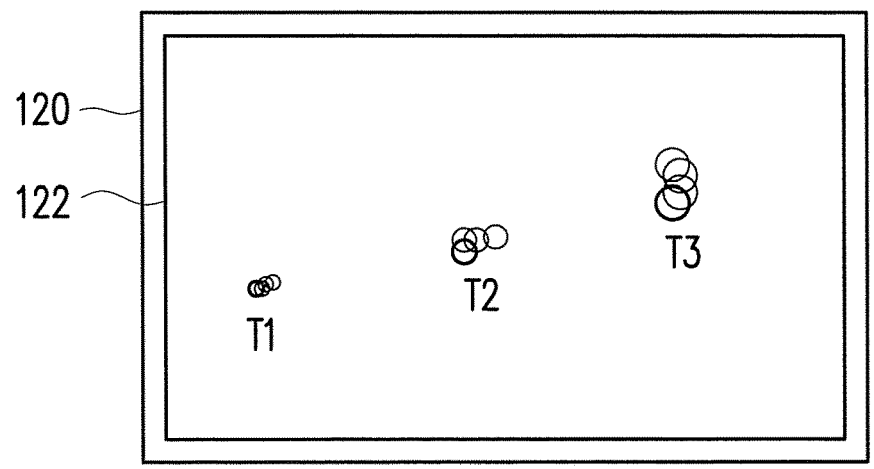
Figure 3C:
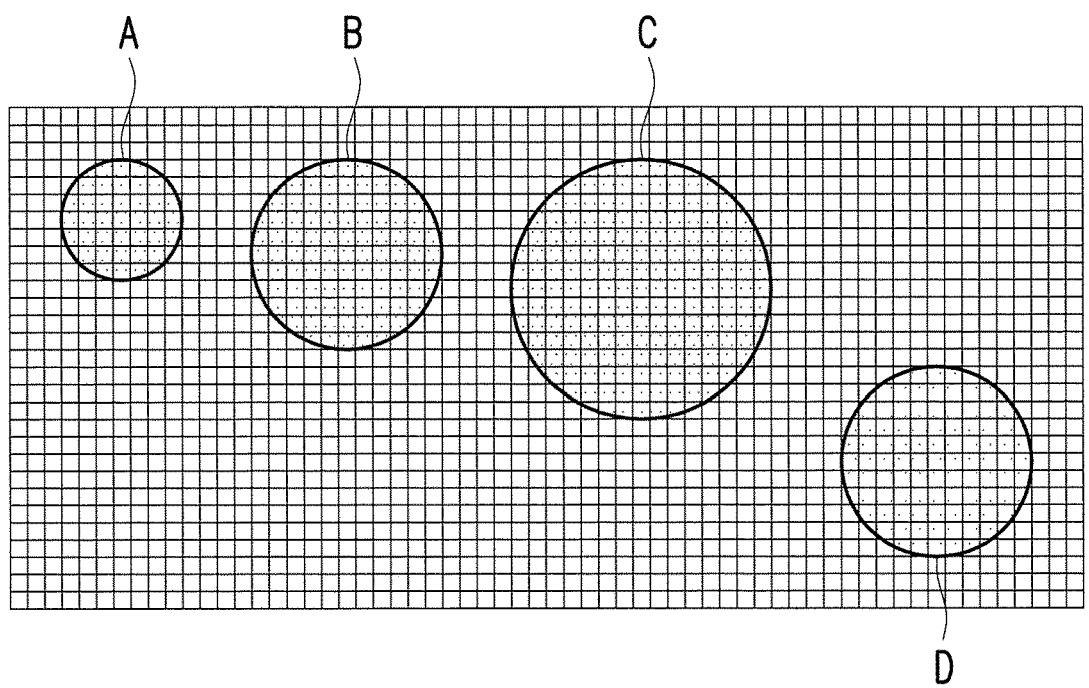

For instance, three input tools P1, P2, and P3 with different areas of tips are depicted in FIG. 3B, and so are the touch areas T1, T2, and T3 of the three input tools P1, P2, and P3 during the touch operation on the touch panel 122 and the corresponding touch operation tracks. FIG. 3C shows the three predetermined areas A, B, and C of tips recorded in the database, and the measures of the areas A, B, and C are 39, 68, and 151. Here, the three predetermined areas A, B, and C of tips respectively correspond to the identifiers ID1, ID2, and ID3 of three input tool data. When the touch operation on the touch panel 122 is performed through the input tool 110, the processing unit 124 may calculate the area D of the tip as 70 according to the area of the touch panel 122 touched by the input tool 110 and generate the identifier ID2 of the input tool 110 through comparison. According to the present embodiment, the area of the tip and the predetermined areas of tips may be obtained through detecting the number of touch points by the sensing electrodes of the touch apparatus 120 during the touch operation on the touch apparatus 120.

Figure 4A:
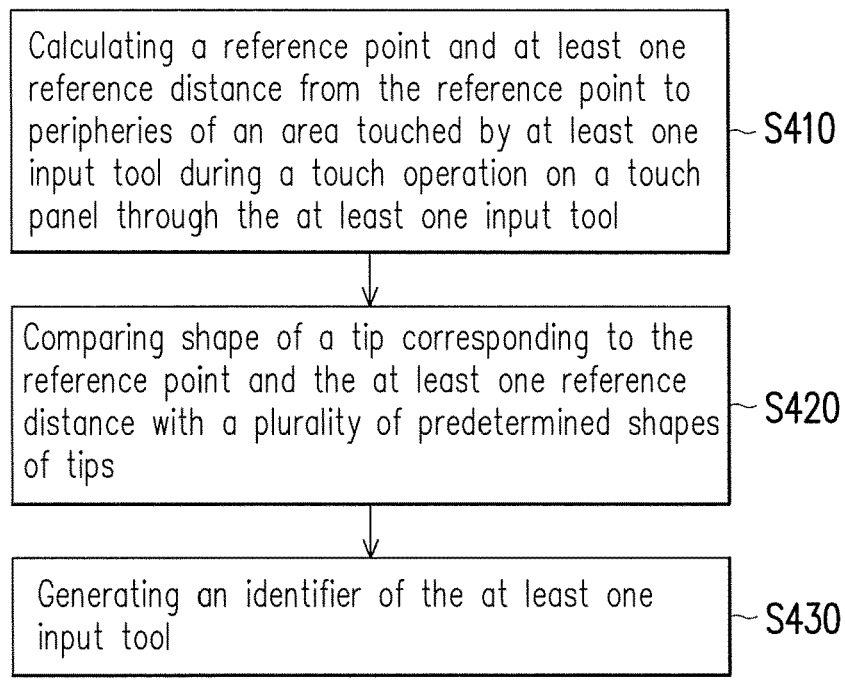
FIG. 4A is a flowchart illustrating a control method of a touch apparatus according to an embodiment of the invention.

How the identifier is generated according to the shape of the tip of the input tool 110 is described below. FIG. 4A is a flowchart illustrating a control method of a touch apparatus according to an embodiment of the invention. As shown in FIG. 4A, in step S410, the processing unit 124 calculates a reference point and at least one reference distance from the reference point to peripheries of an area touched by the input tool 110 during the touch operation on the touch panel 122. The reference point is, for instance, a center of gravity or a geometric center of the touch area, and the reference distance is at least one of the shortest distance or the longest distance from the reference point to the edge of the touch area, for instance. In step S420, the processing unit 124 compares the shape of the tip corresponding to the reference point and the at least one reference distance with a plurality of predetermined shapes of tips. In step S430, the processing unit 124 generates the identifier of the input tool 110 according to the comparison result. Similarly, in consideration of possible errors in actual calculation and comparison of the shape of the tip, the level of difference between the compared shapes may be set to be the smallest level or within a certain range while comparing the shape of the tip and the predetermined shapes of tips according to the present embodiment.

Figure 4B:
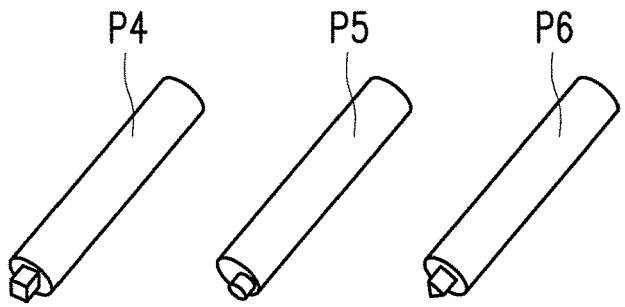
FIG. 4B to FIG. 4D are examples according to an embodiment of the invention.
Figure 4B:
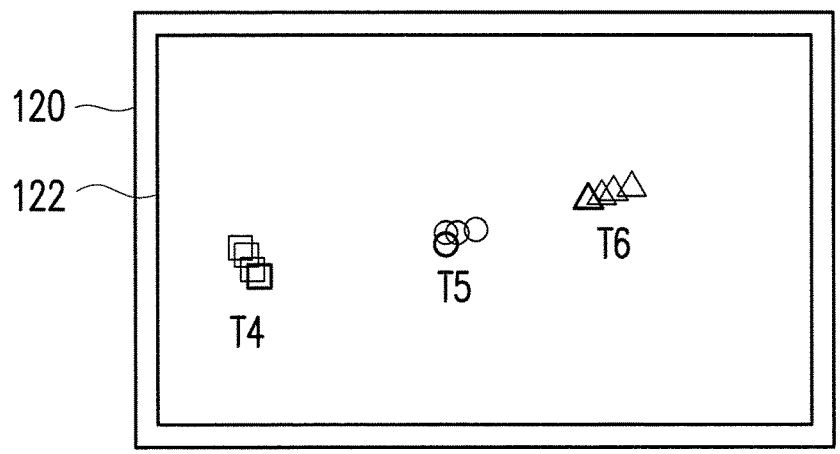
Figure 4C:
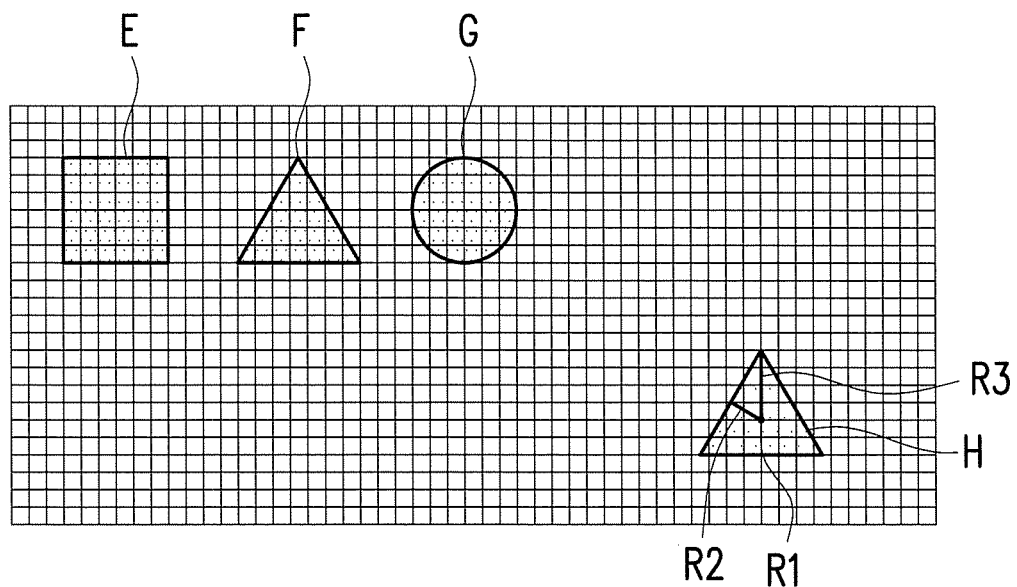
Figure 4D:
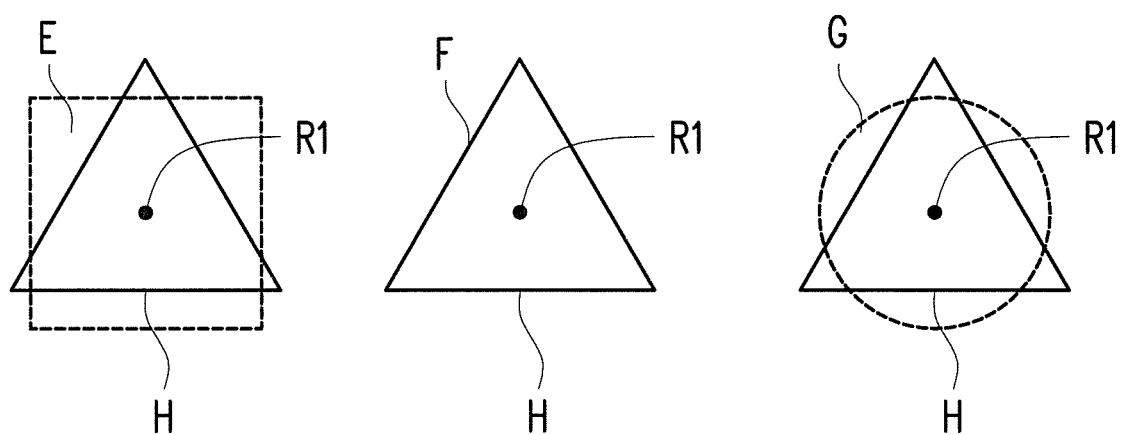

In FIG. 4B, three input tools P4, P5, and P6 with different shapes of tips are depicted, and so are the touch areas T4, T5, and T6 of the three input tools P4, P5, and P6 during the touch operation on the touch panel 122 and the corresponding touch operation tracks. FIG. 4C shows the three predetermined shapes E, F, and G of tips recorded in the database, and the three predetermined shapes E, F, and G are a square, a triangle, and a circle, respectively. Here, the three predetermined shapes E, F, and G of tips respectively correspond to the identifiers ID4, ID5, and ID6 of three input tool data. When the touch operation on the touch panel 122 is performed through the input tool 110, the processing unit 124 may calculate the coordinate center (as the reference point R1) of the touch point corresponding to the area of the touch panel 122 touched by the input tool 110 and calculate the shortest distance (as the reference distance R2) and the longest distance (as the reference distance R3) from the reference point R1 to the edge of the touch area, so as to obtain relevant parameters of the shape H of the tip. The processing unit 124 then aligns the reference point R1 corresponding to the shape H of the tip to the centers of the predetermined shapes E, F, and G of tips and compares the shape H of the tip corresponding to the reference point and the individual reference distance with the predetermined shapes E, F, and G of tips, so as to generate the identifier ID5 of the input tool 110, as shown in FIG. 4D.

Note that while the processing unit 124 compares the shape of the tip corresponding to the reference point and the reference distances with the predetermined shapes of tips, the processing unit 124 may also take the area of the tip into account, such that the comparison result may become more accurate.

Additionally, in consideration of possible errors in actual calculation and comparison of the area of the tip or the shape of the tip, the tip may be designed to have multiple facets (the shape of each of which is triangular, for instance) according to an embodiment of the invention. In another embodiment of the invention, the material of the input tool 110 may be properly selected, so as to reduce the possible errors during the actual touch operation by the input tool 110; moreover, the characteristic data of the input tool 110 may be more consistent with the data stored in the database.

Figures 5A, 5B:
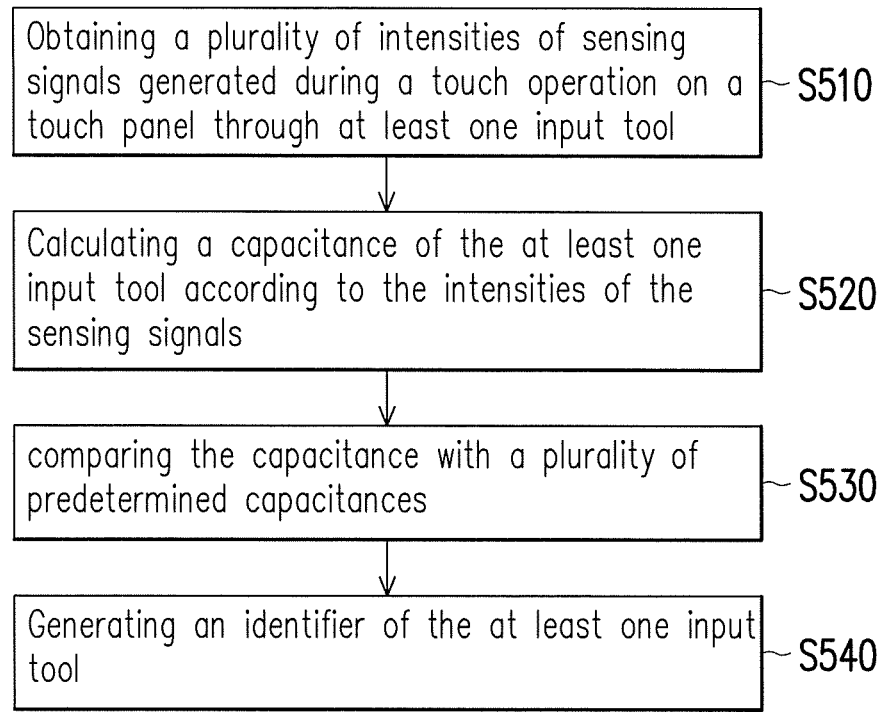
FIG. 5A is a flowchart illustrating a control method of a touch apparatus according to an embodiment of the invention.
FIG. 5B and FIG. 5C are examples according to an embodiment of the invention.

Besides, the capacitance of the input tool 110 may be applied to generate the identifier. FIG. 5A is a flowchart illustrating a control method of a touch apparatus according to an embodiment of the invention. With reference to FIG. 5A, in step S510, the processing unit 124 obtains a plurality of intensities of sensing signals generated during the touch operation on the touch panel 122 through the input tool 110; in step S520, the processing unit 124 calculates the capacitance of the input tool 110 according to the intensities of the sensing signals. Note that the processing unit 124 may calculate the corresponding capacitance of the input tool 110 according to different ways to sample the intensities of the sensing signals (e.g., through obtaining the average of intensities of all sensing signals or the average of intensities of several sensing signals, wherein the intensities of these sensing signals each exceed a threshold value). In step S530, the processing unit 124 compares the capacitance with a plurality of predetermined capacitances; in step S540, the processing unit 124 generates the identifier of the input tool 110 according to the comparison result.

In order to prevent the capacitance of each input tool 110 from being affected by the sensing capacitance of human bodies, the body of the input tool 110 may be made of an insulation material, and only the tip of the input tool 110 is made of a conductive material. Besides, the capacitance of each input tool 110 may be varied because the capacitances may be switched by switches or through the parallel or serial connection of capacitors; areas of two parallel metal films and parameters of distance between two metal films may be applied to adjust the capacitances, or the overlapping area of the two parallel metal films may be adjusted, such that the capacitance of each input tool 110 may be different from each other. The difference in the capacitances allows the individual capacitances to serve as the characteristic data for identification.

Figures 5C, 6:
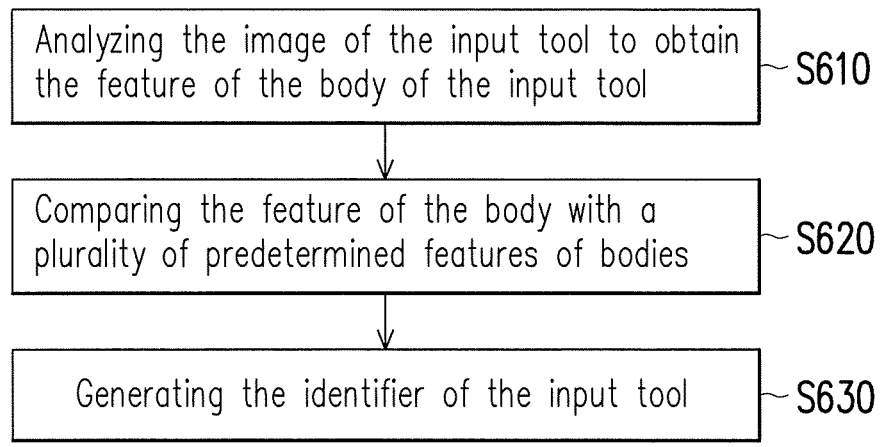
FIG. 6 is a flowchart illustrating a control method of a touch apparatus according to an embodiment of the invention.

In FIG. 5B and FIG. 5C, the intensity of the sensing signal detected by each individual sensing electrode of the touch apparatus 120 is exemplarily shown, and the detected intensity corresponds to the capacitance sensed by each sensing electrode. The processing unit 124 may obtain the capacitance of the input tool 110 through calculating the average of several greatest intensities (e.g., the greatest five intensities of sensing signals), the sum of greatest intensities (e.g., the greatest five intensities of sensing signals), the sum of the intensities of all signals, the sum of the intensities of several sensing signals (wherein the intensities of these sensing signal each exceeds a threshold intensity, e.g., 3), or the average of the intensities of several sensing signals (wherein the intensities of these sensing signals each exceed a threshold intensity, e.g., 3). The processing unit 124 may compare the capacitance with a plurality of predetermined capacitances stored in the database; similar to the above, the processing unit 124 can then generate the identifier of the input tool 110.

In some embodiments of the invention, the touch apparatus 120 may further include at least one image capturing unit. The image capturing unit may be arranged next to the touch panel 122. The processing unit 124 may capture the feature of the body of the input tool 110 through the image capturing unit and thereby generate the identifier of the input tool 110. The image capturing unit includes a charge coupled device (CCD) lens, a complementary metal oxide semiconductor transistor (CMOS) lens, a camcorder equipped with an infrared lens, a camera, and so on, for instance; however, the invention is not limited thereto.

How to generate the identifier of the input tool 110 according to the feature of the body of the input tool 110 is described hereinafter with reference to FIG. 6 in light of said apparatus. FIG. 6 is a flowchart illustrating a control method of a touch apparatus according to an embodiment of the invention. As shown in FIG. 6, in step S610, the processing unit 124 analyzes the image of the input tool 110 to obtain the feature of the body of the input tool 110. The feature of the body includes at least one of a body color, an identification pattern, and a body shape, for instance. In step S620, the processing unit 124 compares the feature of the body with a plurality of predetermined features of bodies. In step S630, the processing unit 124 generates the identifier of the input tool 110 according to the comparison result.

The specific scenario, i.e., the feature of the body is the body color, is described below. According to the present embodiment, plural input tool data including the predetermined body colors and the identifiers can be recorded in the database. Hence, after the processing unit 124 analyzes the image of the input tool 110 to obtain the feature of the body of the input tool 110, the processing unit 124 can compare the feature of the body with a plurality of predetermined features of bodies stored in the database to generate the identifier of the input tool 110.

In addition, the feature of the body may be an identification pattern on the input tool 110 (e.g., on the body), and the identification pattern may be a one-dimensional bar-code, a two-dimensional bar-code, number of stripes, color of stripes, or a combination thereof. According to the present embodiment, plural input tool data including the predetermined identification patterns and the identifiers can be recorded in the database. Hence, after the processing unit 124 analyzes the image of the input tool 110 to obtain the identification pattern of the input tool 110, the processing unit 124 can compare the identification pattern with a plurality of predetermined identification patterns stored in the database to generate the identifier of the input tool 110.

In another aspect, the feature of body of the input tool 110 may also be the body shape. Similarly, according to the present embodiment, plural input tool data including the predetermined body shapes and the identifiers can be recorded in the database. Hence, after the processing unit 124 analyzes the image of the input tool 110 to obtain the body shape of the input tool 110, the processing unit 124 can compare the body shape with a plurality of predetermined body shapes stored in the database to generate the identifier of the input tool 110.

Since the distance from the image capturing unit to the input tool 110 may pose an impact on the accuracy of the characteristic data of the input tool 110, the processing unit 124 provided in an embodiment of the invention may calculate the relative distance from the image capturing unit and the input tool 110 and thereby adjust the size of the captured image to be another size obtained when the distance from the image capturing unit and the input tool 110 is a reference relative distance. As such, in the process of identifying the characteristic data, the difference in the relative distance will no longer cause errors in such identification process.

Moreover, in some embodiments of the invention, the processing unit 124 may detect the characteristic data (e.g., the area of the tip of the input tool 110) through the image capturing unit. Besides, in some embodiments of the invention, the input tool 110 may be a finger of a user. The user may wear rings in different colors or rings having different identification patterns (e.g., different bar-codes) as the characteristic data, and the characteristic data may be provided to the image capturing unit for identification.

The processing unit 124 may further detect the touch position of the input tool 100 on the touch panel 122 through the image capturing unit, so as to determine a touch action of the input tool 110 or obtain a touch operation track of the input tool 110. Thereby, the processing unit 124 not only can identify the input tool 110 through the image capturing unit but also can determine the function (executed by the application program) corresponding to the touch operation of the input tool 110.

According to the type of the characteristic data of the input tool, different determination rules may be provided in several embodiments of the invention, so as to compare the characteristic data with the predetermined characteristic data. Thereby, there may be diverse ways to identify the input tool 110 according to several embodiments of the invention. Specifically, at least one of the features of the tip of the input tool 110, the feature of the body of the input tool 110, and the electrical feature should be taken into consideration by those who implement the invention provided herein according to the design requirements, and thereby the identification result may be more accurate.

To reduce the impact of environmental factors on identification of the input tool 110, the processing unit 124 may filter out environmental noises while receiving the input signals according to an embodiment of the invention, so as to further ensure the accuracy of the characteristic data of the input tool 110.

Moreover, in some embodiments of the invention, after determining the identifier of the input tool 110, the processing unit 124 may consider the touch actions by the input tool 110 at touch positions on the touch panel 122 within a predetermined range as the touch operations of the input tool 110 and thus does not perform the process of determining the identifier of the input tool 110. Thereby, the calculation time required by the processing unit 124 can be reduced.

To sum up, the touch system, the touch apparatus, and the control method of the touch apparatus are provided in several embodiments of the invention, whereby the input tool can be identified according to various characteristic data, such as the area of the tip, the shape of the tip, the color of the body, the identification pattern, the body shape, the capacitance, and so on, so as to determine the specific function correspondingly performed during the touch operation on the touch apparatus through the input tool. As such, if multiple users respectively perform the touch actions with use of different input tools, the correct user who performs the corresponding touch action can be accurately determined according to an embodiment of the invention, and the corresponding touch command can be executed, such that the issue of misunderstanding the touch command caused by the failure to identify the correct user can no longer arise from the scenario in which multiple users are involved.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A touch apparatus comprising:
   a touch panel; and
   a processing unit coupled to the touch panel, the processing unit obtaining at least one appearance characteristic data of at least one input tool and generating an identifier of the at least one input tool according to the at least one appearance characteristic data, wherein the at least one appearance characteristic data comprises a feature of a tip of the at least one input tool, the feature comprises a shape of the tip,
   wherein if a touch operation on the touch panel is performed through the at least one input tool, the processing unit
   generates the identifier of the at least one input tool through calculating a reference point and at least one reference distance from the reference point to peripheries of an area touched by the at least one input tool during the touch operation on the touch panel,
   detects a touch action or a touch operation track of the at least one input tool on the touch apparatus,
   determines a specific function of the touch apparatus corresponding to the touch action or the touch operation track of the at least one input tool and converts the touch action or the touch operation track of the at least one input tool into a control command of the specific function according to the identifier of the at least one input tool, and
   transmits the control command to an application program to perform the specific function through executing the application program, wherein the input tool is a stylus pen.

2. The touch apparatus according to claim 1, wherein the processing unit obtains the at least one appearance characteristic data according to at least one of a feature of a tip of the at least one input tool, a feature of a body of the at least one input tool and an electrical feature of the at least one input tool, wherein the feature of the tip of the at least one input tool is a type of geometric shapes.

3. The touch apparatus according to claim 1, further comprising a database storing a plurality of predetermined characteristic data respectively corresponding to a plurality of predetermined identifiers, the processing unit generating the identifier of the at least one input tool through comparing the at least one appearance characteristic data of the at least one input tool with the predetermined characteristic data,
wherein if the processing unit determines the at least one appearance characteristic data complies with one of the predetermined characteristic data, the processing unit determines that the identifier of the at least one input tool is a predetermined identifier of the predetermined identifiers corresponding to the one of the predetermined characteristic data.

4. The touch apparatus according to claim 1, wherein the at least one appearance characteristic data comprises a feature of a tip of the at least one input tool, the feature comprises an area of the tip, and the processing unit generates the identifier of the at least one input tool through calculating the area of the tip according to an area touched by the at least one input tool during the touch operation on the touch panel and through comparing the area of the tip with a plurality of predetermined areas of tips, wherein the area touched by the same input tool during each of the touch operation are the same, the area touched by different input tools during the touch operation are different.

5. The touch apparatus according to claim 1, wherein the processing unit further generates the identifier of the at least one input tool through comparing the shape of the tip corresponding to the reference point and the at least one reference distance with a plurality of predetermined shapes of tips.

6. The touch apparatus according to claim 1, further comprising:
an image capturing unit coupled to the processing unit and configured to capture a feature of a body of the at least one input tool,
wherein the processing unit analyzes an image of the at least one input tool to obtain the feature of the body of the at least one input tool and compare the feature of the body with a plurality of predetermined features of bodies to generate the identifier of the at least one input tool.

7. The touch apparatus according to claim 6, wherein the feature of the body comprises at least one of a body color, an identification pattern, and a body shape.

8. The touch apparatus according to claim 1, wherein the at least one appearance characteristic data comprises a capacitance, the processing unit obtains a plurality of intensities of sensing signals generated during the touch operation on the touch panel through the at least one input tool, calculates the capacitance of the at least one input tool according to the intensities, and compares the capacitance with a plurality of predetermined capacitances to generate the identifier of the at least one input tool.

9. A touch system comprising:
at least one input tool; and
a touch apparatus comprising:
a touch panel; and
a processing unit coupled to the touch panel, the processing unit obtaining at least one appearance characteristic data of the at least one input tool and generating an identifier of the at least one input tool according to the at least one appearance characteristic data, wherein the at least one appearance characteristic data comprises a feature of a tip of the at least one input tool, the feature comprises a shape of the tip, wherein if a touch operation on the touch panel is performed through the at least one input tool, the processing unit generates the identifier of the at least one input tool through calculating a reference point and at least one reference distance from the reference point to peripheries of an area touched by the at least one input tool during the touch operation on the touch panel, detects a touch action or a touch operation track of the at least one input tool on the touch apparatus, determines a specific function of the touch apparatus corresponding to the touch action or the touch operation track of the at least one input tool and converts the touch action or the touch operation track of the at least one input tool into a control command of the specific function according to the identifier of the at least one input tool, and transmits the control command to an application program to perform the specific function through executing the application program, wherein the input tool is a stylus pen.

10. The touch system according to claim 9, wherein the processing unit obtains the at least one appearance characteristic data according to at least one of a feature of a tip of the at least one input tool, a feature of a body of the at least one input tool and an electrical feature of the at least one input tool, wherein the feature of the tip of the at least one input tool is a type of geometric shapes.

11. A control method of a touch apparatus, the touch apparatus comprising a touch panel, the control method comprising:
obtaining at least one appearance characteristic data of at least one input tool, wherein the at least one appearance characteristic data comprises a feature of a tip of the at least one input tool, the feature comprises a shape of the tip;
generating an identifier of the at least one input tool according to the at least one appearance characteristic data, wherein the step of generating the identifier of the at least one input tool according to the at least one appearance characteristic data comprises:
calculating a reference point and at least one reference distance from the reference point to peripheries of an area touched by the at least one input tool during the touch operation on the touch panel; and
detects a touch action or a touch operation track of the at least one input tool on the touch apparatus;
if a touch action or a touch operation track of the at least one input tool on the touch panel is detected, determining a specific function of the touch apparatus corresponding to the touch action or the touch operation track of the at least one input tool and converts the touch action or the touch operation track of the at least one input tool into a control command of the specific function according to the identifier of the at least one input tool, and transmitting the control command to an application program to perform the specific function through executing the application program, wherein the input tool is a stylus pen.

12. The control method according to claim 11, wherein the touch apparatus further comprises a database storing a plurality of predetermined characteristic data respectively corresponding to a plurality of predetermined identifiers, and the step of generating the identifier of the at least one input tool according to the at least one appearance characteristic data comprises:
generating the identifier of the at least one input tool through comparing the at least one appearance characteristic data of the at least one input tool with the predetermined characteristic data, wherein the step of generating the identifier of the at least one input tool through comparing the at least one appearance characteristic data of the at least one input tool with the predetermined characteristic data comprises:

if the at least one appearance characteristic data is determined to comply with one of the predetermined characteristic data, determining that the identifier of the at least one input tool is a predetermined identifier of the predetermined identifiers corresponding to the one of the predetermined characteristic data.

13. The control method according to claim 11, wherein the at least one appearance characteristic data comprises a feature of a tip of the at least one input tool, the feature of the tip comprises an area of the tip, and the step of generating the identifier of the at least one input tool according to the at least one appearance characteristic data comprises:

calculating the area of the tip according to an area touched by the at least one input tool during the touch operation on the touch panel; and comparing the area of the tip with a plurality of predetermined areas of tips to generate the identifier of the at least one input tool, wherein the area touched by the same input tool during each of the touch operation are the same, the area touched by different input tools during the touch operation are different.

14. The control method according to claim 11, wherein the step of generating the identifier of the at least one input tool according to the at least one appearance characteristic data further comprises:

comparing the shape of the tip corresponding to the reference point and the at least one reference distance with a plurality of predetermined shapes of tips to generate the identifier of the at least one input tool.

15. The control method according to claim 11, wherein the touch apparatus further comprises an image capturing unit, and the step of obtaining the at least one appearance characteristic data of the at least one input tool further comprises:

capturing a feature of a body of the at least one input tool through the image capturing unit.

16. The control method according to claim 15, wherein the step of generating the identifier of the at least one input tool according to the at least one appearance characteristic data comprises:

analyzing an image of the at least one input tool to obtain the feature of the body; and comparing the feature of the body with a plurality of predetermined features of bodies to generate the identifier of the at least one input tool.

17. The control method according to claim 15, wherein the feature of the body comprises at least one of a body color, an identification pattern, and a body shape.

18. The control method according to claim 11, wherein the at least one appearance characteristic data comprises a capacitance, and the step of generating the identifier of the at least one input tool according to the at least one appearance characteristic data comprises:

obtaining a plurality of intensities of sensing signals generated during the touch operation on the touch panel through the at least one input tool;

calculating the capacitance of the at least one input tool according to the intensities of the sensing signals; and comparing the capacitance with a plurality of predetermined capacitances to generate the identifier of the at least one input tool.

* * * * *